United States Patent
De Gersem et al.

(10) Patent No.: US 9,554,520 B2
(45) Date of Patent: Jan. 31, 2017

(54) AGRICULTURAL VEHICLE WITH AN ACCESS PANEL LOCK

(71) Applicant: CNH Industrial America LLC, New Holland, PA (US)

(72) Inventors: Tom De Gersem, Bruges (BE); Ignaas Vanhooren, Houthulst (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/407,371

(22) PCT Filed: Jun. 11, 2013

(86) PCT No.: PCT/EP2013/062048
§ 371 (c)(1),
(2) Date: Dec. 11, 2014

(87) PCT Pub. No.: WO2013/186221
PCT Pub. Date: Dec. 19, 2013

(65) Prior Publication Data
US 2015/0121828 A1    May 7, 2015

(30) Foreign Application Priority Data
Jun. 12, 2012   (BE) .................................. 2012/0391

(51) Int. Cl.
*A01F 21/00*  (2006.01)
*F16P 3/08*  (2006.01)
*A01F 15/08*  (2006.01)

(52) U.S. Cl.
CPC ............... *A01F 21/00* (2013.01); *A01F 15/08* (2013.01); *F16P 3/08* (2013.01)

(58) Field of Classification Search
CPC .......... A01F 21/00; A01F 12/58; A01F 29/18; F16P 3/08; A01D 69/10
(Continued)

(56) References Cited

U.S. PATENT DOCUMENTS 2,072,681 A * 3/1937 Meeker ................. B02C 18/065
                                                          241/199.5
4,319,146 A * 3/1982 Wires, Sr. ................ F16P 3/08
                                                          241/37.5
(Continued)

FOREIGN PATENT DOCUMENTS

| DE | 2640292 A1 | 3/1978 |
| GB | 2079829 A | 1/1982 |
| GB | 2114250 | * 7/1982 |

*Primary Examiner* — John G Weiss
(74) *Attorney, Agent, or Firm* — Patrick M. Sheldrake (57) ABSTRACT

An agricultural machine comprising an input shaft connectable to the power take off shaft of a tractor; a flywheel connected to the input shaft; workings driven by the input shaft; an access panel openable to provide access to the workings of the machine; an access panel handle having a first position for opening and a second position for closing the access panel; and a brake for arresting rotating of the flywheel with a brake handle with a first position for braking the flywheel and a second position for releasing the flywheel; the access panel handle and the brake handle are arranged with respect to each other such that the access panel handle can only be placed in its first opening position when the brake is in first braking position.

16 Claims, 6 Drawing Sheets

(58) Field of Classification Search
USPC .............................. 56/11.3, 131, 320.1, 432
See application file for complete search history.

(56) References Cited

U.S. PATENT DOCUMENTS

| | | | |
|---|---|---|---|
| 4,424,741 A | 1/1984 | Moldestad | |
| 7,600,455 B2 * | 10/2009 | Gass ................... | B23D 59/001 |
| | | | 83/477.1 |
| 8,690,089 B1 * | 4/2014 | Ganser, IV ............... | B02C 7/11 |
| | | | 241/285.3 |
| 2012/0204742 A1 | 8/2012 | Van Vooren et al. | |

* cited by examiner

AGRICULTURAL VEHICLE WITH AN ACCESS PANEL LOCK

This application is the US National Stage filing of International Application Serial No. PCT/EP2013/062048 filed on Jun. 11, 2013 which claims priority to Belgian Application BE2012/0391 filed Jun. 12, 2012, each of which is incorporated herein by reference in its entirety.

FIELD OF THE INVENTION

The present invention relates to an agricultural machine with an access panel providing access to movable parts of the agricultural machine, and more particularly to a lock for such access panel.

BACKGROUND OF THE INVENTION

The present invention is applicable to any kind of machine, in particular to agricultural machines, such as balers. As is generally known, a baler is a machine which picks up from the ground crop material that has previously been cut, windrowed or swathed, and forms the crop material into round or square bales. The workings of the baler, that is to say the internal machinery that forms the bales, will not be described herein as they are not of particular relevance to the present invention and as their construction is well documented in the prior art. It suffices for the present invention to appreciate that the workings of the baler have many moveable parts which pose a safety hazard if left exposed to the operator while the baler is in operation.

The baler derives its power from a power take off (PTO) shaft of a tractor. To ensure smooth operation of the baler, its drive incorporates a large flywheel that is connected to the PTO shaft by an overrunning, or one-way, clutch. On account of this clutch, even when the tractor engine is stopped, it is possible for the flywheel of the baler to continue rotating. Because of this ability of the flywheel and the workings of the baler to continue moving even after the tractor engine has been stopped, it is known to provide a manually operable brake to cease rotation of the flywheel so that servicing work may be carried out safely on the baler. The brake may for example take the form of a brake band that is anchored at one end to the frame of the baler, passes partly around the circumference of the flywheel and is connected at its other end to a toggle mechanism. An actuator or handle may act on the toggle mechanism to apply and release the brake.

In normal use, the moveable parts of the baler are covered by access panels. The flywheel is covered by a hinged hood and other moveable parts of the baler are protected by hinged access panels. When the baler needs attention, for example if a blockage has occurred, an operator stops the tractor and descends from the tractor cab. Next, the flywheel brake should be applied to bring all the moving parts of the baler to a standstill and only when it is safe does the operator raise the hood or open one of the side doors to provide access to the workings of the baler.

A problem with existing balers is that nothing prevents an operator from inadvertently or intentionally omitting to apply the flywheel brake before opening one of the access panels, thus exposing him to a risk of severe injury. It will be clear that this problem would apply to any agricultural machine having workings driven from the PTO shaft of a tractor by way of a flywheel that is capable of overrunning.

In WO2011/018456 solutions to this safety problem are provided; however, those proposed solutions are rather complex and hence costly. Further the solution focuses on one particular aspect of the problem, being the door opening and continued rotation of the flywheel while also other aspects such as door instability, operator ergonomics and effects on the entire machine frame should be looked at.

SUMMARY OF THE INVENTION

It is an object of embodiments of the present invention to provide a low cost and integrated solution for the safety problem posed by access panels covering moveable parts of an agricultural machine.

The above objective is accomplished by an agricultural machine according to embodiments of the present invention.

In a first aspect, the present invention provides an agricultural machine comprising an input shaft connectable to a power take off shaft of a tractor; a flywheel connected to the input shaft; workings (being defined as any device within the machine consisting of a piece of machinery, the device having moveable parts that perform some function), or thus at least one moveable part driven by the input shaft; an access panel openable to provide access to the at least one moveable part of the machine; an access panel handle having a first position for opening and a second position for closing the access panel; and an brake with a brake handle for ceasing rotating of the flywheel, the brake handle having a first position for braking the flywheel and a second position for releasing the flywheel. In accordance with embodiments of the present invention, the agricultural machine is adapted for preventing opening of the access panel while the flywheel is rotating, by arrangement of the access panel handle and the brake handle with respect to one another such that the access panel handle can only be placed in its first opening position when the brake handle is in its first braking position.

In embodiments of the present invention, either one of the brake handle or access panel handle may have a mechanical means mounted thereon, while the other one of the brake handle or access panel handle has an opening wherein the mechanical means can engage. The access panel handle and the brake handle may be arranged with respect to one another such that the mechanical means is engaged in the opening when the brake handle is not in its first braking positioning, whereby the engagement of the mechanical means in the opening prevents the placing of the access panel handle in its first opening position.

In embodiments of the present invention, the mechanical means may be an arc.

In particular embodiments, the mechanical means may be mounted on the brake handle.

In particular embodiments of the present invention, the access panel handle may have a protrusion which will prevent the movement of the brake handle to its second position when the access panel handle is in its second position.

The access panel handle may be connected to closing features for locking the access panel, the closing features being operated by movement of the access panel handle from a locking position to an unlocking position when the access panel handle is moving from the second position to the first position.

The brake handle may be an over-center mechanism.

In an alternative embodiment either one of the brake handle or access panel handle may have a mechanical means mounted thereon. The access panel handle and the brake handle may be arranged with respect to one another such that the mechanical means prevents the placing of the access panel handle in its first opening position when the brake handle is not in its first braking position.

In a second aspect of the present invention (combinable with the first aspect) the agricultural machine may comprise a first mechanical system, attached to the agricultural machine and the access panel, for delivering a suitable force to keep the access panel open, the first mechanical means being operable over a first opening range; and a second mechanical system attached to the agricultural machine and the access panel, the second mechanical system being capable of fixing the access panel in a plurality of spaced apart predetermined positions, selectable by an operator.

In embodiments of the present invention, the opening range of the second mechanical system may be less than the first opening range of the first mechanical system.

In embodiments of the present invention, the first mechanical system may be a spring, for example a gas spring.

The second mechanical system may comprise a rigid body, movable by an operator, the rigid body having a plurality of space apart indents; and an element fixed to the agricultural machine, the element being dimensioned such that it can engage in the indents, each engagement of the element with one of the indents corresponding to one of the predetermined positions.

In a third aspect of the present invention (combinable with any of the previous aspects) an agricultural machine is provided wherein the attachment position of the first mechanical system may be determined by performing a design optimization adapted for minimizing the force exhibited on the agricultural machine, such design optimization taking into account the various positions of the access panel and the weight shifts related thereto.

In embodiments of the present invention, the design optimization may also determine the force that the first mechanical system can generate.

In embodiments of the present invention, the design optimization may further determine the optimal positions of the indents of the second mechanical system.

In a fourth aspect of the invention (combinable with the first and/or second aspect and/or third aspect of the invention), the access panel may further comprise a first portion being made of deformable material, e.g. plastic material; and a second frame being made of a material more rigid than such deformable material, the second frame being attached to the first portion to thereby contribute to the overall rigidity of the access panel. The second elongated portion may be part of the access panel lock and may be adapted to engage with lock hooks attached to the agricultural machine.

In embodiments of the present invention, a rigid element connected to the second frame may engage with a corresponding bracket element connected to the agricultural machine when the access panel is in a closed position.

In embodiments of the present invention, an elongated portion may be connected to the second frame, wherein the elongated portion is attached at at least two positions of the first portion to thereby contribute to the overall rigidity of the access panel.

It is to be noted that one or more of the aspect of the present invention may be combined with one or more of the solutions as disclosed in WO2011/018456.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 1:
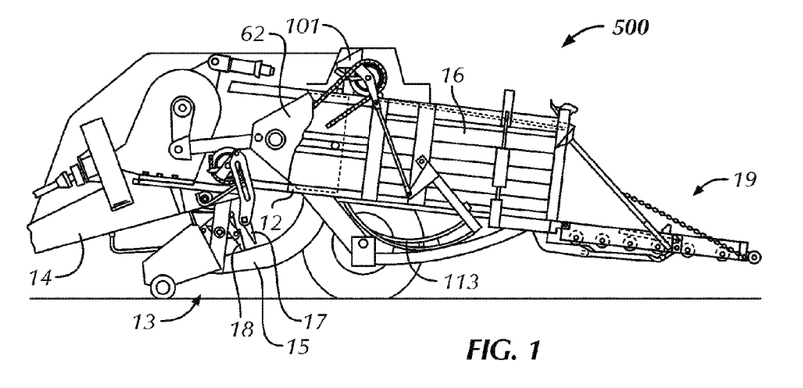
FIG. 1 is a schematic, side sectioned view of a typical rectangular agricultural baler to which embodiments of the present invention may be applied.

One type of agricultural machine to which embodiments of the present invention may be applied is an agricultural baler. Where in embodiments of the present invention reference is made to agricultural balers, reference is made to machines for forming bales from agricultural crop material, such as forming cuboid shaped bales by any suitable means. An example of such an agricultural baler is illustrated in FIG. 1. FIG. 1 shows a prior art agricultural baler 500 comprising a frame 10 which is equipped with a forwardly extending tongue 14 at its front end with hitch means (not shown) for coupling the baler 500 to a towing tractor. A pick-up assembly 13 lifts windrowed crop material off the field as the baler 500 is travelled thereover and delivers such material into the front end of a rearwardly and upwardly curved, charge-forming feeder duct 15. The duct 15 communicates at its upper end with an overhead, fore-and-aft extending bale-forming chamber 16 into which crop charges are loaded by a cyclically operating stuffer mechanism 17. A continuously operating packer mechanism 18 at the lower front end of the feeder duct 15 continuously feeds and packs material into the duct 15 as to cause charges of the crop material to take on and assume the internal configuration of the duct 15 prior to periodic engagement by the stuffer 17 and insertion up into the bale-forming chamber 16. The feeder duct 15 may be equipped with means (not illustrated) for establishing whether a complete charge has been formed therein and operating the stuffer mechanism 17 in response thereto. Each action of the stuffer mechanism 17 introduces a "charge" or "flake" of crop material from the duct 15 into the chamber 16.

A plunger 62 reciprocates in a fore-and-aft direction within the bale-forming chamber 16. Biomass fed via the feeder duct 15 is thereby compacted, e.g. compressed or otherwise treated, so as to form bales in the above-described operation of the agricultural baler 500. Cuboid shaped bales are formed. The completed bales are tied with twine or a similar lineal object to make them self-supporting, for example for shipping and storage. Once tied, the bales are discharged from the rear end of the bale-forming chamber 16 onto a discharge in the form of a chute, generally designated 19.

For tying the bales, at least one knotter (not illustrated in the drawings) for automatically tying the bales of crop material, is provided on the baler 500 for each guiding a lineal object around a bale and forming a closed loop in the lineal object encircling the bale, for example by tying, stapling or crimping. In accordance with embodiments of the present invention (not illustrated in the drawings), a knotter system may be provided, comprising a plurality of knotters which operate substantially simultaneously, such that a bale is tied with a plurality of lineal objects.

A knotter can be implemented as known in the art, and may for example comprise at least one source of lineal object, e.g. at least one twine supply roll, a lineal object holder 101 for holding one end of the lineal object, a cutter for cutting the lineal object and a needle 113, for example implemented as a reciprocating inserter arm, for bringing another piece, e.g. end, of the lineal object towards the end held by the lineal object holder 101, for securing the lineal object to itself so as to make a loop. As illustrated in FIG. 1, the needle 113 is mounted on the baler frame 10 and may be swung back and forth across the bale-forming chamber 16 when activated. The needle 113 has an "at-home" or rest position fully below the bale-forming chamber 16 and a "full-throw" position extended completely across the bale-forming chamber 16.

It is such a needle 113, besides other moveable parts, which may form a safety issue for an operator even after the machine has been halted.

Figure 2:
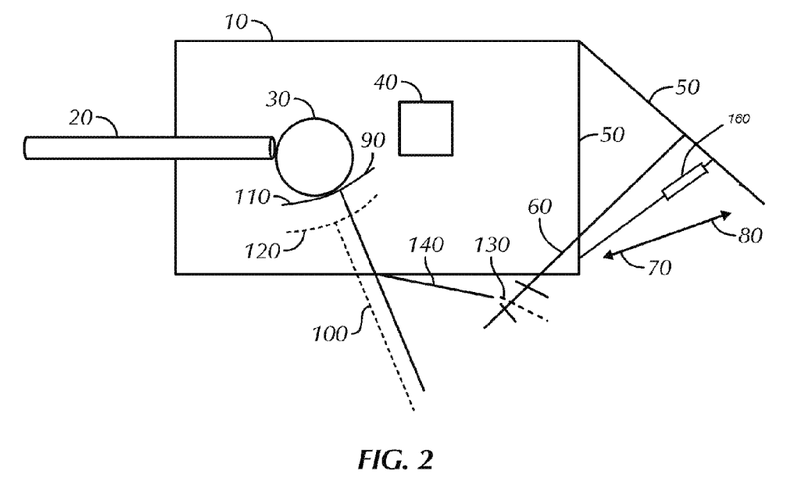
FIG. 2 schematically shows a schematic, side view of an agricultural machine with a safety lock in accordance with a first embodiment of the present invention.

As illustrated schematically in FIG. 2, embodiments of the present invention provide for an agricultural machine with a frame 10 adapted with one or more arrangements contributing to the safety for operators of such machines, such machines being characterized by elements moving (e.g. rotating or moving back and forth) during machine operations and thereby defining a security risk for operators when they would approach one or more of such elements. Typically such agricultural machine has an input shaft 20 connectable to the power take off shaft of a tractor, a flywheel 30 connected to the input shaft 20, e.g. by way of an overrunning clutch, moveable elements or workings 40 driven by the input shaft, an access panel 50 openable to provide access to the workings 40 of the machine, e.g. pivotably attached to the frame 10, and an access panel handle 60 having a first position 80 where the access panel 50 is open and a second position 70 where the access panel 50 is closed. Alternatively formulated the agricultural machine has at least one movable part 40, adapted for moving; a driver 20, operatively connected to the at least one movable part 40, for arranging the movement of the at least one movable part 40; an access 50, associated with at least one movable part 40, the access panel having a covering position wherein the access panel 50 at least partly covers the at least one movable part 40 it is associated with, and a second (partially) uncovering position, wherein the access panel 50 no longer covers the at least one movable part 40 it is associated with.

The invention provides a safety arrangement by providing a brake 90 for ceasing and additionally preventing rotating of the flywheel with a brake handle 100 with a first position 110 for braking the flywheel 30 and preventing any movement of the flywheel 30 (shown in full lines) and a second position 120 for releasing the flywheel 30 (shown in dotted lines). The ceasing of the movement of the flywheel can be realized by physically applying a brake to the flywheel 30 of the machine, but an alternative realization interfering with the clutch within the machine is also possible.

The agricultural machine is adapted for preventing opening of the access panel 50 while the flywheel 30 is rotating. The agricultural machine is further characterized in that the access panel handle 60 and the brake handle 100 are arranged with respect to one another such that the access panel handle 60 can only be placed in its first opening position 80 when the brake handle 100 is in its first braking position 110.

Figure 3:
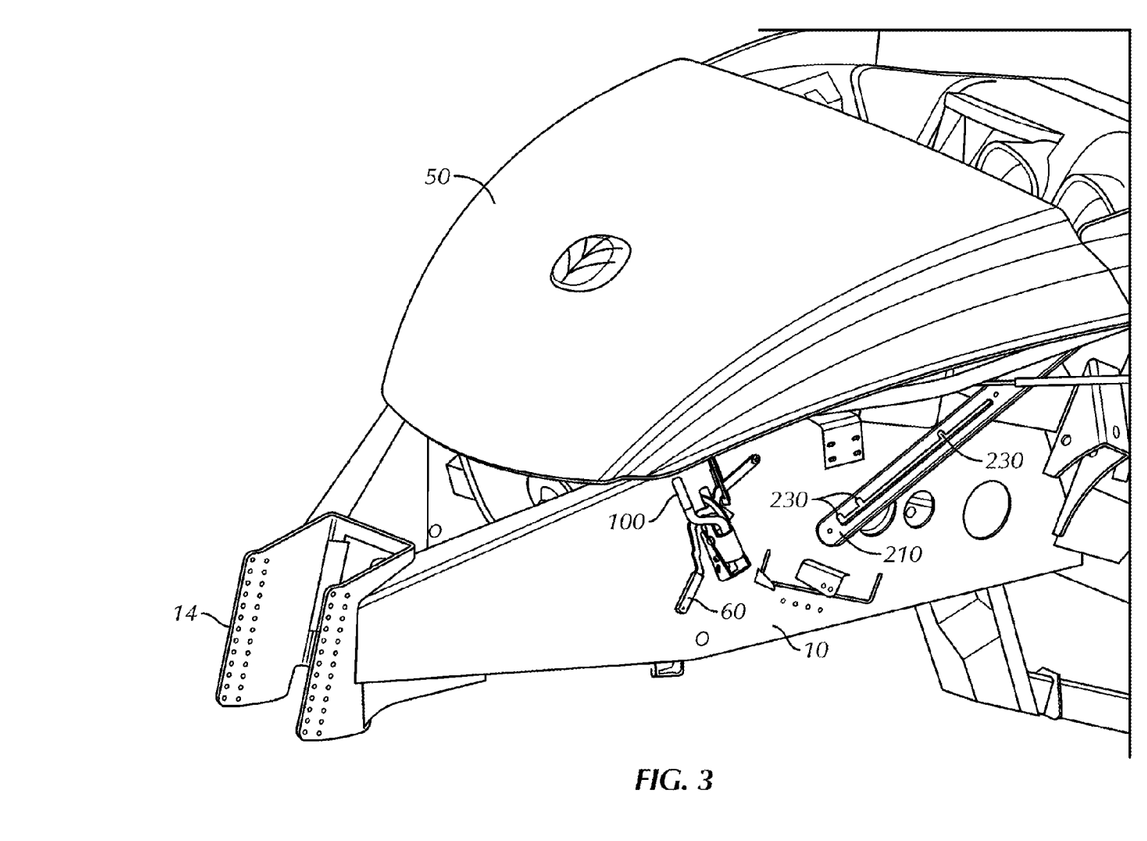
FIG. 3 shows an embodiment of part of an agricultural machine provided with a safety lock in accordance with a second embodiment of the present invention, in which embodiment the access panel is closed.
Figure 4:
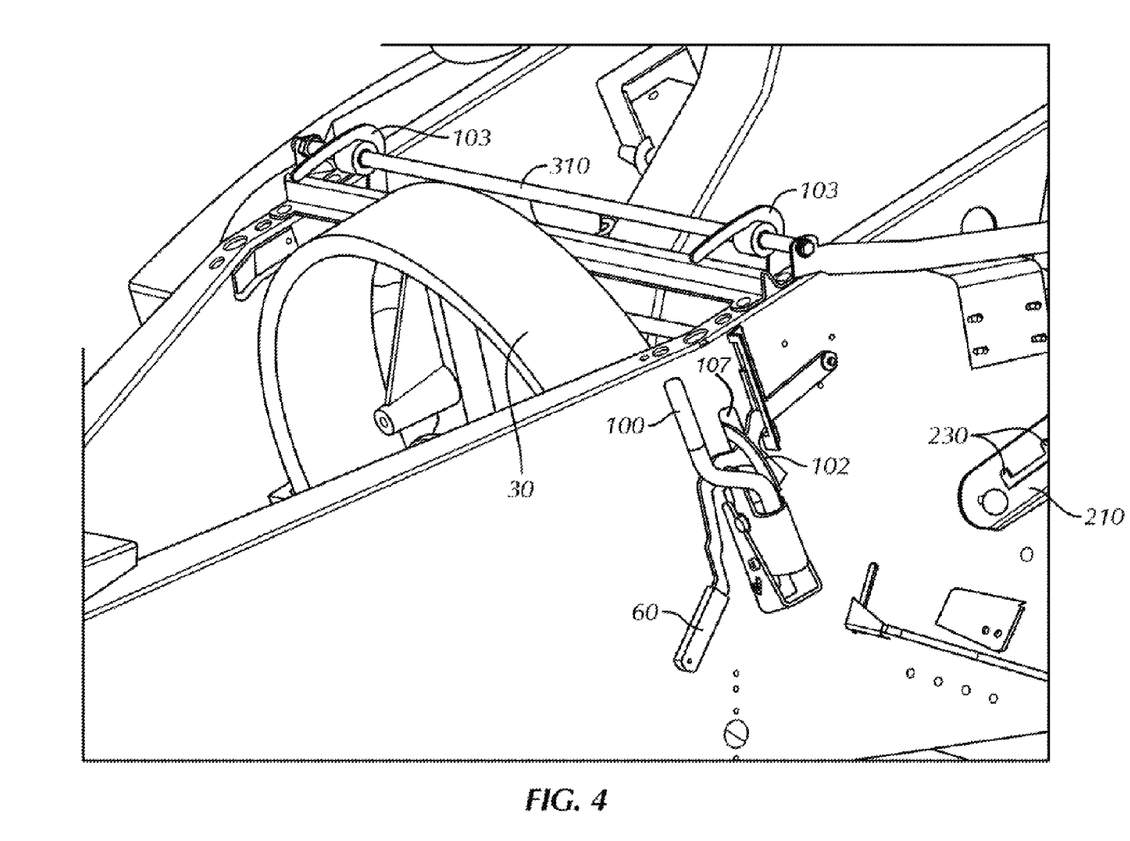
FIG. 4 shows part of the agricultural machine of FIG. 3, with the access panel removed for clarity purposes.
Figure 5:
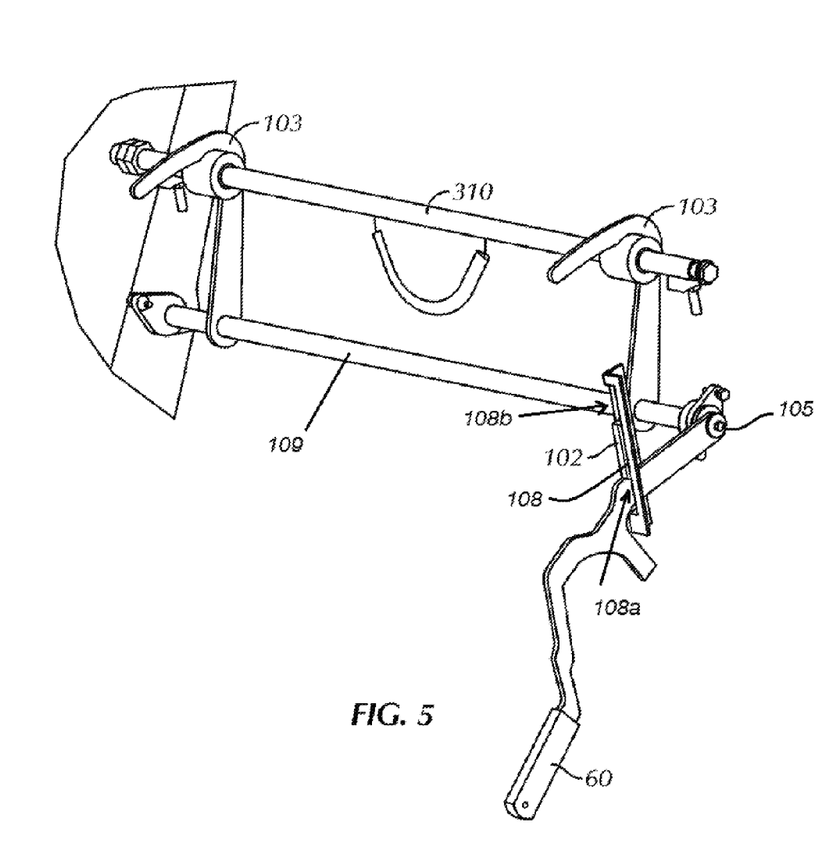
FIG. 5 illustrates the safety lock system used in the embodiment illustrated in FIG. 3 and FIG. 4.

One embodiment of the present invention is illustrated in FIG. 3 to FIG. 5. These drawings illustrate part of a frame 10 of an agricultural machine, with a forwardly extending tongue 14 for coupling the agricultural machine to a towing tractor. An input shaft (not illustrated) connectable to the power take off shaft of the tractor, connects to a flywheel 30 which is rotatably mounted with respect to the frame 10. At least one moveable part 40 (not visible in FIG. 3 or FIG. 4) is driven by the input shaft. As illustrated in FIG. 3, the flywheel and the at least one moveable part 40 are covered by an access panel 50. The access panel 50 can be opened to provide access to the flywheel 30 and at least one movable part 40. For opening the access panel 50, an access panel handle 60 is provided, which has a first position for opening and a second position for closing the access panel 50. In the example illustrated in FIG. 3 and FIG. 4, the first position is shown, where the access panel handle 60 is in a downward position. The second position is where the access panel handle 60 is rotated upwardly (see arrow 106) around a hinge point 105 in an upper position. The invention, however, is not limited to this embodiment. The agricultural machine is furthermore provided with a brake 90 (not visible in FIG. 3 and FIG. 4) for braking the flywheel 30. The brake is provided with a brake handle 100. The brake handle 100 has two distinguishable positions, e.g. a first lowered position and a second upward position. When the brake handle 100 is brought in the first position, the brake 90 is moved so as to engage with the flywheel 30 for braking it. When the brake handle 100 is brought in the second position, as can be seen in FIG. 3 and FIG. 4, the brake 90 is moved with respect to the flywheel 30 so as to disengage and release it so that it can rotate again. The safety system of the agricultural machine according to embodiments of the present invention is such that the arrangement of the access panel handle 60 and the brake handle 100 is such that the access panel handle 60 can only be placed in its opening position when the brake handle 100 is in its braking position. In the embodiment illustrated in FIG. 3 and FIG. 4, the brake handle 100 is in an upper position, which is the position wherein the flywheel 30 is released. When it is desired to access the at least one moveable part 40, the brake handle 100 can be pulled downward, which frees the access panel handle 60 for movement towards its opening position. As long as the brake handle 100 has not been brought in its braking position, the access panel handle 60 cannot be moved. In the embodiment illustrated, this is due to a mechanical means 102 like a hook, provided on the brake handle 100, which in the second (non-braking or releasing) position of the brake handle 100 fits in a slot 107 in the frame 10. By bringing the brake handle 100 in its first, lowered braking position, the mechanical means 102 is disengaged from the slot 107, and the access panel handle 60 is allowed to move from its position preventing opening of the access panel 50 to a position allowing opening of the access panel 50.

This way, the agricultural machine according to embodiments of the present invention is adapted for preventing opening of the access panel 50 while the flywheel 30 is rotating.

A more detailed view of the access panel handle 60 as used in the embodiment illustrated in FIG. 3 and FIG. 4, and how it is fitted in a slot 108 of an element attached to the frame 10 is illustrated in FIG. 5. In FIG. 5 the access panel handle 60 is in the position for closing and locking the access panel 50. It can be seen that, by moving the access panel handle 60 around rotation point 105 from its position for closing the access panel 50 (as illustrated in FIGS. 3 to 5) to its position for opening the access panel 50, an axis 109 is rotated, thus moving closing features 103 connected thereto from a position in which they keep the access panel 50 closed towards a position in which the access panel 50 is released and hence allowed to move from its closed position to an open or at least partially open position. The slot 108 is provided with additional recesses 108a and 108b. These recesses 108a and 108b are positioned with respect to the rotating arm of the handle 60, such that the rotating arm of the handle 60 is in a resting position when placed inside the recesses 108a or 108b. When the access panel handle 60 is in its position for closing and locking the access panel 50, the rotating arm of the handle 60 is placed inside the recess 108a (see FIGS. 3 to 5). To be able to rotate the handle 60 upwardly towards its position for opening the access panel 50, it must be moved in a direction away from the frame 10 so that it is out of this recess 108a and moveable upwardly within the slot 108. Once the handle 60 is in the position for opening the access panel 50, the handle 60 can be moved again in a direction towards the frame 10 so that the rotating arm of the handle 60 now rests inside recess 108b. When the rotating arm of the handle 60 is in one of the recesses 108*a* or 108*b*, it will not be able to move inside the slot 108.

Figure 6:
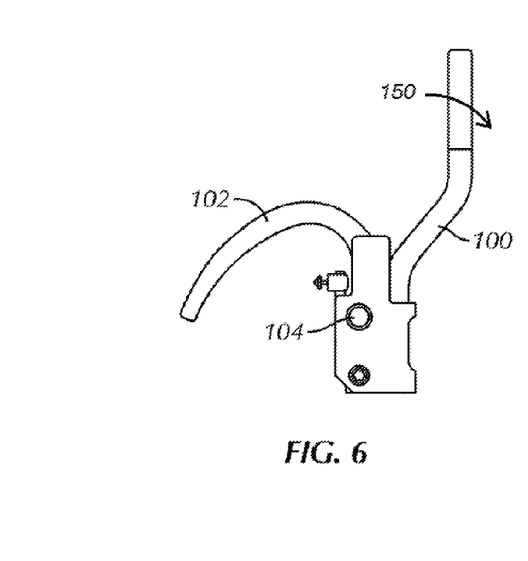
FIG. 6 is a detailed side view of the brake handle of the safety lock system of FIG. 5.

A more detailed view of the brake handle 100 used in the embodiment illustrated in FIG. 3 and FIG. 4 is shown in FIG. 6. This brake handle 100, constructed as an over-center mechanism is provided with the mechanical means 102 such as a hook, adapted for fitting in a slot 107 in the frame 10. By pulling the brake handle 100 in the direction of arrow 150 from the locking position as shown in FIG. 3, 4 or 6, to an unlocking position, the mechanical means 102 rotates around a point of rotation 104. At the same time, the brake handle 100 will also move the brake 90 into the first braking position 110. The mechanical means 102 is constructed in such a way that the access panel handle 60 cannot be moved before the mechanical means 102 is completely removed from the slot 107.

Furthermore, the access panel handle 60 can be provided with a protrusion which at least partly will block the slot 107 when the access panel handle 60 is in the unlocked position. That way, accidental release of the brake handle 100 is prevented, since the mechanical means 102 will be unable to enter the slot 107. The brake handle 100 is constructed and positioned in such a way (by using an over-center mechanism) that the actual release of the brake 90 will only take place once the mechanical means 102 has entered the slot 107.

However, under specific conditions it might be necessary to release the brake 90 while the access panel 50 is open. This could be the case if e.g. maintenance work needs to be done to the flywheel 30, and for which it is necessary that the flywheel 30 can be moved manually, so without the input shaft 20 rotation. In order to achieve this, the access panel handle 60 can be moved upwardly in recess 108*b*, such that the protrusion no longer blocks slot 107. Now, the mechanical means 102 can move again in the slot 107 and release the brake 90 on the flywheel 30. If the access panel handle 60 is released, the protrusion will rest on top of the mechanical means 102. Before the access panel 50 can be closed, the brake handle 100 will need to be moved again to its braking position. Now the access panel 50 can be closed, the access panel handle 60 can be placed in its locking position, and the brake handle can be placed into the position where it no longer is braking the flywheel 30.

In an alternative embodiment of a safety arrangement according to the present invention (schematically shown in FIG. 2) the brake handle 100 can have a mechanical means 140 mounted thereon, as an addition to the mechanical means 102 or to replace the mechanical means 102, while the access panel handle 60 can have an opening 130 wherein the mechanical means 140 can be received. This opening 130 can be used in addition to the slot 107 or can be used to replace the slot 107. In this embodiment, the access panel handle 60 and the brake handle 100 are arranged with respect to each other such that the mechanical means 140 is engaged in the opening when the brake handle 100 is not in its first braking positioning, the engagement of the mechanical means 140 in the opening preventing the placing of the access panel handle 60 in its first opening position. Obviously, the alternative wherein the mechanical means is mounted on the access panel handle 60 and the opening is part of the brake handle 100 is also possible and also forms an embodiment of the present invention.

As discussed above safety on agricultural machines such as balers, require an access panel 50 safety lock, hence providing a system, such that the access panel cannot open while the machine is running. More precisely a system is provided, such that if workings or moving elements 40 of such machine, covered by the access panel 50 and reachable by an operator when the access panel 50 would be open, are actually moving (e.g. rotating) then the access panel 50 cannot be opened, or at least not be opened in a position that an operator can reach them. Hence the system can be applicable to an entire machine or to subparts thereof. It is self-evident that in order for it to be economically valuable, such system should be cost efficient, hence the costs of creating, assembling and adjustment should be low. Further the system should be reliable, hence also serve its safety function under severe working conditions, e.g. when dust enters the system. Therefore rather simple systems are to be selected by e.g. avoiding too many components.

An example in accordance with the system can be an arc 102, mounted on the brake handle 100 of the flywheel 30, assuring that the access panel handle 60 cannot be manipulated as long as the flywheel brake 90, applied to the flywheel driving the moveable, e.g. rotating, elements 40, is not activated. When the flywheel brake 90 is fully tensioned, the access panel handle 60 is capable to be released, such that the access panel 50 can be opened.

Equivalent arrangements, wherein the arc or a similar element, is mounted on the access panel handle 60 instead, are also possible, as long as their relative arrangement is such that opening the access panel 50 is not possible without braking. Moreover braking is only one possibility for ensuring safety. The handle of any other system, halting the movement, e.g. acting on the clutch, can be considered for the intelligent configuration, as described above.

When further enhancement of the safety access panel lock system according to embodiments of the present invention as for example described above is to be considered, one may complement the invention with an access panel 50 selector, be it that such selector can be also used separately, i.e. without the access panel lock system. Typically an access panel 50 is pivotably attached to the frame 10 of the machine and is supplied with a mechanical means for assisted opening, e.g. a spring such as a gas spring. In case of failure of that mechanical system or unexpected other forces being active on the access panel (e.g. wind), an uncontrolled closing of the access panel might occur, creating a safety issue, potentially leading to injury or death of the operator when carrying out activities within the machine. Further failure of the access panel lock might lead to another safety issue by accidental opening of the access panel, e.g. during transport, leading to imbalance of the entire machine, especially if the access panel swings open to its maximum position. Further the acting of unexpected heavy forces (it is to be noted that due to the size of the access panel even a slight gust of wind might result in a heavy total force) on the access panel might create damage to the mechanical system, e.g. when such system is stretched beyond its normal operating range (e.g. leading to rupture of the gas spring), and even to the access panel itself. The enhanced system provides for a so-called access panel selector being adapted to solve one or more of the above mentioned problems, by ensuring that the access panel can be positioned in a plurality of predefined positions.

Figure 7:
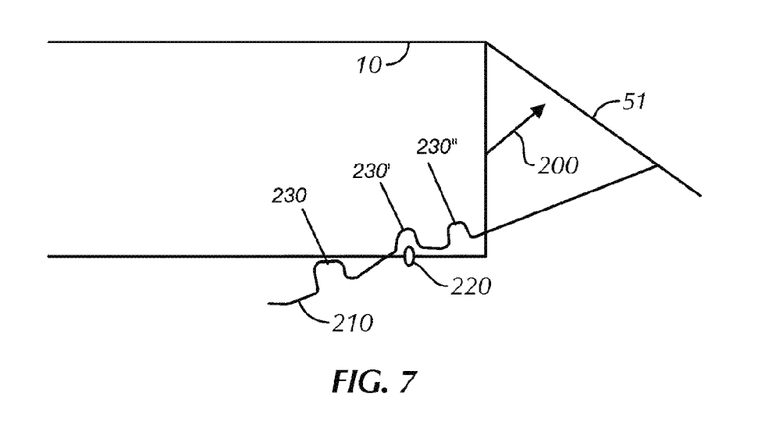
FIG. 7 shows a schematic, side view of a part of an agricultural machine with a safety lock in accordance with a further embodiment of the present invention.

A part of the baler is schematically illustrated in FIG. 7, whereby a side access panel 50 is swung open, so that access to the interior of the baler is accomplished. An access panel selector according to embodiments of the present invention can be implemented by means of a first mechanical system 200, attached to the frame 10 of the agricultural machine and to the access panel 50, for delivering the force to keep the access panel 50 open, the first mechanical system being operable over a first opening range. A second mechanical system 210 is attached to the frame 10 of the agricultural machine and the access panel 50, the second mechanical system 210 being capable of fixing the access panel in a plurality of spaced apart predetermined positions, selectable by an operator.

In an embodiment of such access panel selector (as shown in FIG. 3 and FIG. 4, and as further schematically shown in FIG. 7 the second mechanical means comprises a rigid body 210, movable by an operator, the rigid body 210 having a plurality of spaced apart indents 230; and an element 220 fixed to the frame 10 of the agricultural machine, the element being dimensioned such that it can engage in the indents. Each engagement of the element 220 with one of the indents 230 corresponds to one of the predetermined positions the access panel can be fixed in.

Upon unlocking the access panel 50, this access panel may be lifted automatically by means of the action of the first mechanical system 200. Typically springs are used and gas springs are particularly advantageous for performing this function, as these do not physically exert force on the access panel 50. The access panel 50 may come to rest in a first position, since element 220 will be moved from a first indent 230 to a second indent 230'. An operator wanting to open the access panel 50 further, may further lift the access panel 50, for example by making the element 220 to move to another indent 230" in the rigid body. In order for the operator to open the access panel 50, he will have to position element 220 out of the indent 230 and into the slot which is provided in the second mechanical system 210. A first way of doing this, is by pushing the access panel in the direction of the frame 10 of the machine, so that it is pushed out of the indent 230. Once the element 220 is in the slot, it can now be moved towards the next indent 230' by pushing the access panel 50 upwards. If the element 220 is reaching the next indent 230', the access panel 50, due to the way it is attached to the frame 10, will push the element or selector 220 to the indent 230', thus locking the access panel 50 in this new position. Again, if the operator wants to move the access panel 50 even more, he will again need to push the access panel 50 in the direction of the frame 10, so that element 220 is again in the slot and now can be moved towards the next indent 230". Due to the connection of the access panel 50 to the frame 10, e.g. by using a spring positioning the access panel 50 with relation to the frame 10, the access panel 50 will be in a rest position when the element 220, which is connected to the access panel 50, is positioned in any of the indents 230, 230', 230". The access panel 50 and element 220 will be moved out of this rest position and into a moving position by pushing the access panel 50 in the direction of the frame and thus compressing the spring.

Another possibility is that the element 220 can be released from the indent 230 by pulling the access panel 50 in a direction away from the frame 10. Again, due to the connection of the access panel 50 to the frame 10, e.g. by using a spring positioning the access door 50 with relation to the frame 10, the access door 50 will be in a rest position when the selector 220, which is connected to the access door 50, is positioned in any of the indents 230, 230', 230". The access panel 50 and selector 220 will be moved out of this rest position and into a moving position by pulling the access panel 50 in the direction away from the frame and thus stretching the spring. In both ways, the element 220 is secured when the access door 50 is in a stable position, and the access door 50 actively needs to be moved to an instable position before the access door 50 can be lifted or lowered towards a next position. That way, accidental movement of the access door 50 is prevented.

By ensuring that the access panel can be positioned rather fixed in such predetermined positions, unexpected further opening or closing thereof is prevented. Moreover if the last most open position defined by said selector is still within the normal operating range of the mechanical system (like the spring) also protection thereof is realized. Further one may select as very first opening position a rather small opening of the access panel, allowing for visual inspection but preventing entering of the operator, hence again contributing to the operator safety. Further allowing one or more positions related to non-complete opening of the access panel also allows for convenient opening capabilities for relatively small people, thereby contributing to operator ergonomics.

It is an advantage of the access panel selector according to embodiments of the present invention, formed by the first and second mechanical systems 200, 210, that if a fault would occur at the lock, and the access panel 50 would be opened accidentally, the selector would make sure that the access panel 50 stops at a particular position, predetermined to be not too high, such that for example maximum transport height is not exceeded.

It is a further advantage of a selector according to embodiments of the present invention, formed by the first and second mechanical systems 200, 210, that if a gas spring for assisting the access panel 50 in opening would break to unlock, then the selector would lock the access panel 50 in a predetermined position, depending on the position of the access panel 50 at that time. Hence an operator would not be endangered by access panels 50 accidentally opening or closing.

The combined operation of the first mechanical system 200 and the second mechanical system 210 results in an opening operation, starting with applying the brake 90 by moving the brake handle 100 to its braking position, unlocking the lock by moving the access panel handle 60 towards its releasing position, releasing the selector 220 from the indent 230 and smoothly lifting the access panel 50 by the first mechanical system (gas springs) without requiring (or at most a little) exerting of a physical force by the operator, till a first position is reached. When a further larger opening is required the selector is set to a next position.

As indicated, various predetermined positions can be selected, like various sizes of openings, depending on the portion of the internals of the machine one needs to work on. Further, one may select a position related to the maximum opening range of the first mechanical system (e.g. by making the selector shorter than the corresponding maximum stroke of the gas spring). As such the selector contributes to providing a system for realizing opening of the machine access panel on an as needed basis while taking into account both operator safety and restrictions of the other components of the access panel system.

As an example a three mode (hence a three position) selector is provided, one enabling work on the flywheel shear bolt and the stuffer only and a few other, related to more opening of the access panel 50.

From the above it becomes clear that many design considerations must be taken into account when working out an integrated safety access panel lock system according to embodiments of the present invention, such as selector positions, force of the first mechanical system (one or more springs) while one must realize that such systems also act on the frame 10 of the agricultural machine. Further the forces (of the springs but also of the wind impact on the access panel 50) and balance of the machine depend on the opening positions but also on other design choices such as the position of the joining of the first mechanical system on the frame 10 and the place of the pivot of the access panel 50.

The invention therefore also provides for a use of a design optimization environment. The selection and use of one or more design parameters determined based on such environment, more in particular determining the optimal attachment position of the first mechanical system to the machine frame 10 is put forward as a first design variable which may be used for minimizing the force exhibited on the agricultural machine.

Such design optimization can be adapted for taking into account the various positions of the access panel 50 (and hence the impact of the wind modelled thereon) and/or the weight shifts related thereto. Further the design optimization may also determine the force that the first mechanical system can generate, taking into account operator ergonomics, expressed in the easiness of manipulating the access panel 50 in any position. As the selector provides predetermined access panel positions, the design optimization may further determine the optimal positions defined thereby, for instance by fixing the indents 230 of the second mechanical system 210. The design environment will input other design parameters, such as for example a range of possible forces of the springs, estimates of wind force. Further the environment is capable to compute forces and torques and provide a means to display the various possibilities to the designer, such that he or she can select from a plurality of possibilities in this multi-objective optimization.

Figure 8:
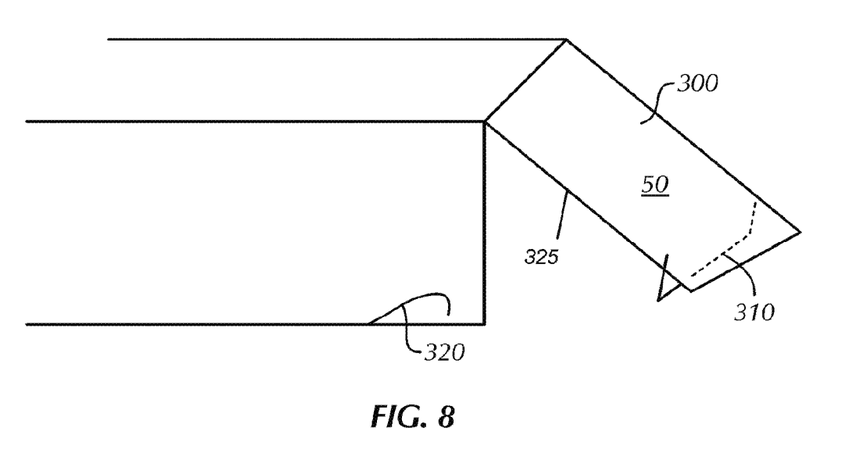
FIG. 8 shows a schematic, side view of an agricultural machine with an access pane lock according to further embodiments of the present invention.

As already noted above the access panel 50 for agricultural machines in accordance with embodiments of the present invention may have a substantial size. Typically, the access panel 50 may be made of plastic material 300, which is deformable under influence of heat and forces applied to it. Therefore, just using locks placed at some spots on one side of the access pane 150 may result in an unsafe lock, since deformation of the access panel 50, which may be made of a deformable material like plastic, leads to changes in positions of such locks compared with the original design. Therefore, in one embodiment of the invention, instead of locks attached to the plastic deformable portion 300, the plastic deformable portion 300 is connected to a rigid framework 325 and an elongated portion (tube) 310. The elongated portion 310 may be attached at least at two spaced apart positions of the first portion 300 to thereby contribute to the overall rigidity of the access panel 50. Further, the elongated portion 310 becomes part of the access panel lock and is adapted to engage with lock hooks attached to the agricultural machine. As such a sturdy lock is achieved and a lock system that requires little adjustment and after heavy use still functions well.

Figure 9:
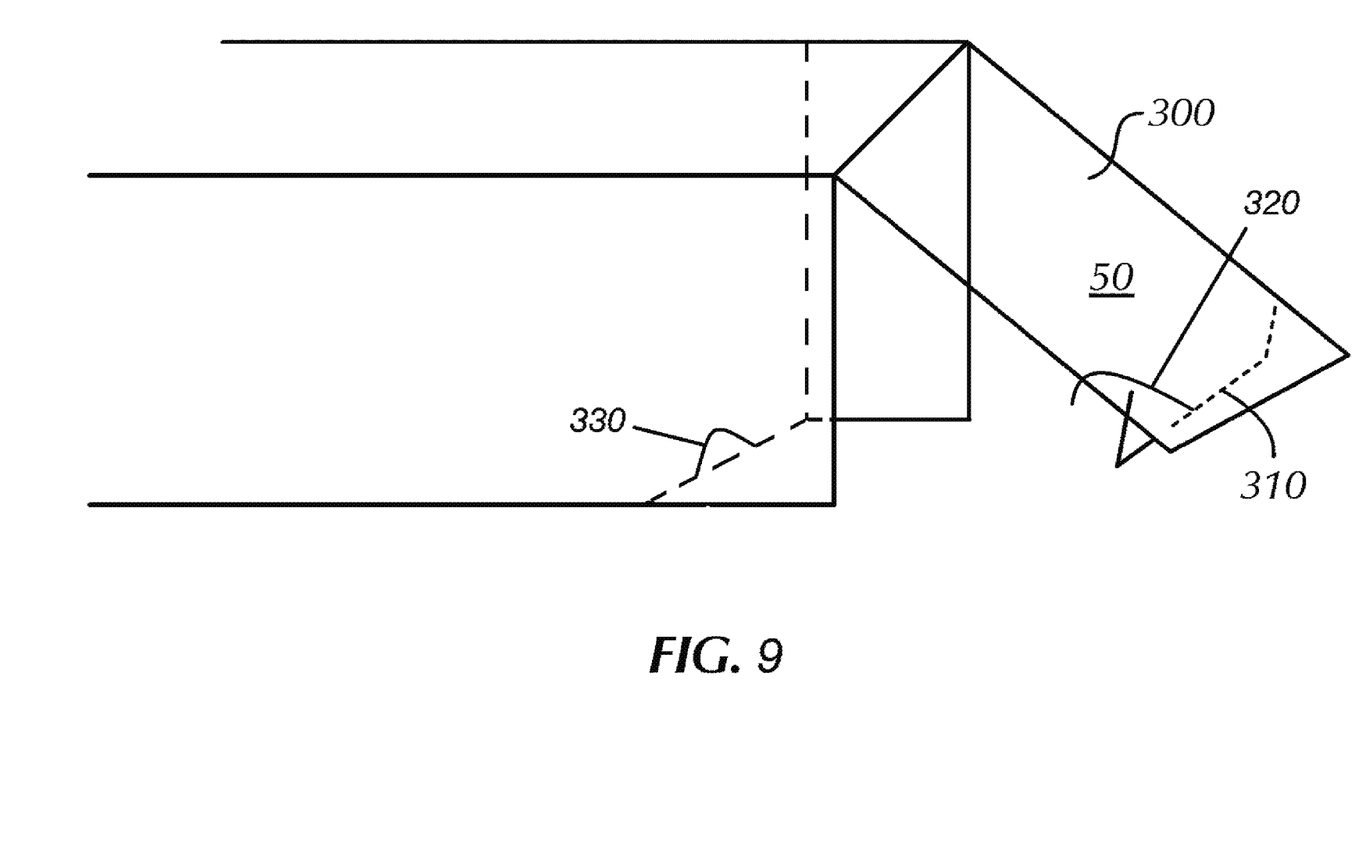
FIG. 9 shows a schematic, side view of an agricultural machine with an access pane lock according to further embodiments of the present invention.

Such further arrangement is schematically shown in FIG. 8. It is illustrated that a brake handle 100 and access panel handle 60 safety arrangement according to embodiments of the present invention can be further enhanced (separate or combined with the position selector approach discussed above) by an improved access panel 50 and corresponding lock. In accordance with embodiments of the present invention, an elongated element 310 may be provided which is made of a material more rigid than the deformable material of which the access panel 50 is formed, the elongate element 310 for example being made from metal. The elongated element may be in the form of a tube or a bar or an arc, and is attached at at least two positions of the rigid framework 325, or can be part of the rigid framework 325. The deformable material 300 of the access panel 50 is at its turn connected to the rigid framework 325, to thereby contribute to the overall rigidity of this access panel 50. By attaching the deformable material 300 of the access panel 50 to the elongated element 310 and the framework 325, it may become an integrated part of the access panel 50, thus forming a solid construction. It is an advantage of connecting such elongate element 310 and framework 325 to the access panel 50 that the dimensions of the access panel 50 now may be preserved at high temperature differences. The elongated element 310 forms part of an access panel lock and is adapted to engage with lock hooks 103 (see also FIG. 5) attached to the frame 10 of the agricultural machine. These lock hooks 103 will prevent the access panel 50 to move upwards, since these hooks 103 will block any upward movement when they are in their locking position. A rigid element 320 can also be connected to the elongated element 310 and can cooperate with a corresponding bracket 330 when the access panel 50 is in its closed position as shown in FIG. 9. The rigid element 320 will then be placed inside the bracket 330 such that no sideward movement of the access panel 50 is possible. Additionally, the rigid element 320 or the bracket 330 can be equipped with a protection edge, e.g. made out of rubber, to increase the locking capacity of the rigid element 320 within the bracket 330.

One may state that in this embodiment of the invention a further integrated approach is used wherein it is ensured that that the lock remains as a fairly controlled position (and hence little post adjustment), even when its related access panel is unstable due to deformation. A further advantage is that the material such as plastic around the locks is no longer destroyed due to localized stress. Further the entire access panel 50 becomes a more solid construction due to the supporting role of the rigid framework 325 and the elongated portion 310, even if there are high temperature differences (e.g. between −10° C. and +65° C., in particular for instance between 5° C. and 40° C.) across the access panel 50.

The above embodiments can be used separate from or combined with the safety lock according to embodiments of the present invention and the access panel position selector, with or without applying the design optimizations described earlier.

The invention claimed is:

1. An agricultural machine, comprising:
   a machine frame;
   an input shaft connectable to a power take off shaft of a tractor;
   a flywheel connected to the input shaft;
   at least one moveable part driven by the input shaft;
   an access panel connected to the machine frame and openable to provide access to the at least one moveable part of the machine;
   an access panel handle having a first position for opening and a second position that closes the access panel; and
   a brake with a brake handle with a first position that brakes the flywheel and a second position that releases the flywheel;
   wherein the the access panel handle and the brake handle are arranged with respect to one another such that the access panel handle is only positionable in a first opening position when the brake handle is in the first braking position.

2. The agricultural machine of claim 1, wherein either one of the brake handle or the access panel handle have a mechanical arrangement mounted thereon, while the other one of the brake handle or access panel handle have an opening wherein the mechanical arrangement engages the access panel handle and the brake handle being arranged with respect to one another such that the mechanical arrangement is engaged in the opening when the brake handle is not in its first braking positioning, the engagement of the mechanical arrangement in the opening preventing the placing of the access panel handle in its first opening position.

3. The agricultural machine of claim 1, wherein either one of the brake handle or the access panel handle have a mechanical arrangement mounted thereon, the access panel handle and the brake handle being arranged with respect to one another such that the mechanical arrangement prevents the placing of the access panel handle in its first opening position when the brake handle is not in its first braking position.

4. The agricultural machine of claim 3, wherein the mechanical arrangement on the access panel handle is a protrusion that prevents the movement of the brake handle to its second position when the access panel handle is in the second position.

5. The agricultural machine of claim 2, wherein the mechanical arrangement is mounted on the brake handle.

6. The agricultural machine of claim 2, wherein the mechanical arrangement is an arc.

7. The agricultural machine of claim 1, wherein the access panel handle is connected to closing features to lock the access panel, the closing features being operated by movement of the access panel handle from a locking position to an unlocking position when the access panel handle is moving from the second position to the first position.

8. The agricultural machine of claim 1, wherein the brake handle is an over-center mechanism.

9. The agricultural machine of claim 1, further comprising:
   a first mechanical system, attached to the machine frame and the access panel, to deliver a suitable force to keep the access panel open, the first mechanical arrangement being operable over a first opening range; and
   a second mechanical system attached to the machine frame and the access panel, the second mechanical system being capable of fixing the access panel in a plurality of spaced apart predetermined positions.

10. The agricultural machine of claim 9 wherein the opening range of the second mechanical system is less than the first opening range of the first mechanical system.

11. The agricultural machine of claim 9, wherein the first mechanical system is a spring.

12. The agricultural machine of claim 9, wherein the second mechanical system comprises:
   a rigid body, movable by an operator, the rigid body having a plurality of spaced apart indents; and
   an element fixed to the machine frame, the element being dimensioned such that it can engage in the indents, each engagement of the element with one of the indents corresponding to one of the predetermined positions.

13. The agricultural machine of claim 1, wherein the access panel further comprises:
   a first portion being made of deformable material; and
   a second frame being made of a material more rigid than such deformable material, the second frame being attached to the first portion to thereby contribute to the overall rigidity of the access panel.

14. The agricultural machine of claim 13, wherein a rigid element connected to the second frame engages with a corresponding bracket element connected to the machine frame when the access panel is in a closed position.

15. The agricultural machine of claim 13, wherein an elongated portion is connected to the second frame, and wherein the elongated portion is attachable to at least two positions of the first portion to thereby facilitate overall rigidity of the access panel.

16. The agricultural machine of claim 15, wherein the second elongated portion is part of the access panel lock and being adapted to engage with the rigid element.

* * * * *